US012291430B2

(12) United States Patent
Svensson-Hilford

(10) Patent No.: US 12,291,430 B2
(45) Date of Patent: May 6, 2025

(54) ELECTRONIC ELEVATOR GUARD DEVICE AND METHOD FOR MONITORING A SET OF INTEGRITY STATES OF A PLURALITY OF ELEVATOR FEATURES

(71) Applicant: Inventio AG, Hergiswil (CH)

(72) Inventor: Lennart Svensson-Hilford, Teltow (DE)

(73) Assignee: INVENTIO AG, Hergiswil (CH)

(*) Notice: Subject to any disclaimer, the term of this patent is extended or adjusted under 35 U.S.C. 154(b) by 1579 days.

(21) Appl. No.: 16/481,867

(22) PCT Filed: Jan. 26, 2018

(86) PCT No.: PCT/EP2018/051904
§ 371 (c)(1),
(2) Date: Jul. 30, 2019

(87) PCT Pub. No.: WO2018/138234
PCT Pub. Date: Aug. 2, 2018

(65) Prior Publication Data

US 2019/0375610 A1 Dec. 12, 2019

(30) Foreign Application Priority Data

Jan. 30, 2017 (EP) .................................... 17153771

(51) Int. Cl.
*B66B 5/00* (2006.01)
*B66B 1/34* (2006.01)
*B66B 1/46* (2006.01)

(52) U.S. Cl.
CPC .......... *B66B 5/0031* (2013.01); *B66B 1/3461* (2013.01); *B66B 5/0025* (2013.01); *B66B 1/463* (2013.01); *B66B 2201/402* (2013.01)

(58) Field of Classification Search
CPC .................... B66B 5/00; B66B 5/0006; B66B 5/0018–0037; B66B 5/02–025; B66B 5/028–145
See application file for complete search history.

(56) References Cited

U.S. PATENT DOCUMENTS 4,649,515 A * 3/1987 Thompson .......... G06F 11/2257 706/903
4,697,243 A * 9/1987 Moore ................ G06F 11/2257 714/E11.157

(Continued)

FOREIGN PATENT DOCUMENTS

CN 101048330 A 10/2007
CN 102656109 A 9/2012

(Continued)

*Primary Examiner* — Christopher Uhlir
(74) *Attorney, Agent, or Firm* — William J. Clemens; Shumaker, Loop & Kendrick, LLP

(57) ABSTRACT

An electronic elevator guard device that monitors a set of integrity states of a plurality of elevator features includes at least one sensor in an elevator and configured for monitoring at least a first of the integrity states and generating a first monitoring signal based on a sensed current status of the first integrity state. The guard device includes a questioning device having or communicating with a human-machine interface and configured for asking predetermined questions to a consulted person and for receiving the person's answers via the human-machine interface, the questions relating to at least a second of the integrity states, and generating a second monitoring signal based on at least one answer. The guard device includes an evaluation device configured for generating an overall monitoring signal based on the first and second monitoring signals and sending the overall signal to a remote recipient via a communication device.

15 Claims, 2 Drawing Sheets

(56) References Cited

U.S. PATENT DOCUMENTS

| | | | |
|---|---|---|---|
| 8,719,038 B1 * | 5/2014 | Gazdzinski | G10L 15/00 704/7 |
| 2008/0283342 A1 | 11/2008 | Deplazes et al. | |
| 2012/0176217 A1 | 7/2012 | Tamaribuchi et al. | |
| 2013/0220740 A1 | 8/2013 | Yoo | |
| 2015/0284214 A1 | 10/2015 | Park et al. | |
| 2016/0311647 A1 | 10/2016 | Peterson et al. | |
| 2018/0141780 A1 * | 5/2018 | Franck | B66B 5/0087 |
| 2018/0186599 A1 * | 7/2018 | Shaw | B66B 5/0025 |

FOREIGN PATENT DOCUMENTS

| | | | |
|---|---|---|---|
| CN | 103079979 | A | 5/2013 |
| CN | 104609270 | A | 5/2015 |
| CN | 105829223 | A | 8/2016 |
| EP | 1267230 | A2 | 12/2002 |
| EP | 1267230 | A3 | 12/2004 |
| EP | 2336070 | A1 | 6/2011 |
| JP | 2007210767 | A | 8/2007 |

* cited by examiner

ELECTRONIC ELEVATOR GUARD DEVICE AND METHOD FOR MONITORING A SET OF INTEGRITY STATES OF A PLURALITY OF ELEVATOR FEATURES

FIELD

The present invention relates to elevators. Particularly, the invention relates to a device for monitoring a set of integrity states of a plurality of features in an elevator. Furthermore, the invention relates to an elevator provided with such device as well as to a method to be performed by such device.

BACKGROUND

As elevators are applied for transporting passengers along substantial vertical distances, strict safety requirements have to be fulfilled. Particularly, safety-relevant elevator features generally need to be monitored continuously or repeatedly. Such elevator features may comprise, inter alia, functions of the elevator avoiding that for example an elevator car may be displaced as long as its car door or an associated floor door is opened, functions of the elevator avoiding that a car door may be unlocked as long as the car is outside of an unlocking area within an elevator shaft, functions of the elevator enabling calling for help in case of an emergency, etc. Other elevator features to be monitored may relate to an integrity of elevator components. For example, the car light should be operative, floor doors or car doors should not be mechanically damaged, instructions for evacuating passengers from the elevator should be provided at suitable locations and should be readable and updated, etc.

In some countries, official regulations rule that a set of integrity states (e.g. checklist) of a plurality of elevator features is repeatedly monitored by a trained person. For example, in Germany, the official regulation TRBS 3121 (Technische Regel für Betriebssicherheit GMBI. Nr. 77 vom 20. November 2009 S. 1602) defines the duties of such person. The trained person is generally referred to as elevator guard. The elevator guard is obliged to repeatedly visit and inspect the elevator and its components in order to monitor the set of integrity states of the plurality of elevator features. Depending on characteristics such as a frequency of use of the elevator, technical equipment of the elevator, an age of the elevator and/or a height of the elevator, such inspection needs to be performed in certain time intervals, typically at least every two weeks or, in cases of high use frequency, even every day or several times a day. Accordingly, the monitoring objective requires substantive efforts and manpower and thereby induces substantive labor costs.

Accordingly, there may be a need for an approach with which such efforts and/or costs may be reduced while still enabling monitoring the set of integrity states of the plurality of elevator features with sufficiently high reliability.

SUMMARY

Such needs may be met with the subject-matter in the following specification.

According to a first aspect of the invention, a device for monitoring a set of integrity states of a plurality of elevator features is proposed. Such device will be referred to herein as an electronic elevator guard device or, in short, guard device. Such guard device comprises at least one sensor, a questioning device and an evaluation device. The sensor is installed in the elevator and is configured for monitoring at least a first one of the integrity states of an elevator feature. Furthermore, the sensor is configured for generating a first monitoring signal based on a sensed current status of the first integrity state. The questioning device comprises or communicates with a human-machine interface (HMI). The HMI may be part of the electronic elevator guard device or may be provided as a separate device. The questioning device is configured for asking predetermined questions to a consulted person. Furthermore, the questioning device is adapted for receiving the person's answer. Both, asking and receiving the answer may be performed via the human-machine interface. The questions relate to at least a second one of the integrity states of an elevator feature. The questioning device is further configured for generating a second monitoring signal based on at least one received answer. The evaluation device is configured for generating an overall monitoring signal based on the first and second monitoring signals. Such overall monitoring signal may represent a current status of the set of integrity states to be monitored.

According to a second aspect of the invention, an elevator comprising an electronic elevator guard device in accordance with an embodiment of the first aspect of the invention is proposed.

According to a third aspect of the invention, a method for monitoring a set of integrity states of a plurality of elevator features is proposed. Such method is referred to herein as electronic elevator guard method and comprises the following steps, possibly but not necessarily in the indicated order: (a) monitoring at least a first one of the integrity states of an elevator feature using at least one sensor installed in the elevator and generating a first monitoring signal based on a sensed current status of the first integrity state; (b) asking predetermined questions to a consulted person and receiving the person's answers using a questioning device communicating with a human-machine interface, the questions relating to at least a second one of the integrity states of an elevator feature, and generating a second monitoring signal based on at least one answer; and (c) generating an overall monitoring signal based on the first and second monitoring signals.

Ideas underlying embodiments of the present invention may be interpreted as being based, inter alia and without restricting the scope of the invention, on the following observations and recognitions.

As indicated above, monitoring integrity states of a plurality of elevator features using a human elevator guard requires substantive efforts and induces costs.

Accordingly, there was an objective to supersede the services of such human elevator guard.

One approach could be to automatize all the duties to be performed by the human elevator guard. However, it has been found that at least some of these duties are difficult to automatize. Particularly, it has been observed that, on the one hand, a list of integrity states of a plurality of elevator features to be monitored, as defined for example in official regulations, may require some duties which may hardly be taken over by machines without incurring excessive costs.

On the other hand, it has been found that many of those duties which are not easy to transfer to automation may be easily performed by humans, even if they are not specifically trained. As one example only, official regulations may dictate that floor doors and elevator doors shall not be mechanically damaged. While such damages are hardly to be detected by simple and cheap sensors, a human observer may easily recognize such damages upon visual inspection.

It is therefore proposed to provide an electronic elevator guard device with both, one or more sensors for automatically performing some of the duties of an elevator guard, i.e. for automatically monitoring some of the integrity states of some elevator features, as well as a questioning device with a human-machine interface via which the help of a human assistant may be requested in order to fulfil other ones of the elevator guard's duties by such human assistant and then answering respective questions.

The evaluation device of the guard device may then generate an overall monitoring result or signal based on both, the first monitoring signals being provided based on the detected current status of the first integrity values obtained from the sensors in an automated manner, as well as based on the second monitoring signals which are generated based on the answers provided by the consulted person acting as a human assistant. Such overall monitoring signal may then indicate with a sufficiently high probability whether or not the required integrity of all the monitored elevator features is currently given or whether for example a maintenance service for the elevator should be initiated e.g. for repairing defect elevator components.

According to an embodiment, the guard device further comprises a communication device which is configured for sending signals to a remote recipient.

In other words, the guard device not only generates an overall monitoring signal with its evaluation device but also includes a communication device via which it may communicate with a remote recipient and send information to such remote recipient. For example, such remote recipient could be a person or an institution being responsible for the safety of an elevator. Using the communication device, the electronic elevator guard device could provide such remote recipient with suitable information about a current safety status of the elevator.

For example, according to an embodiment, the communication device could be configured for sending a signal relating to the overall monitoring signal to the remote recipient.

In other words, the signal transferred to the remote recipient by the communication device could be the overall monitoring signal generated by the evaluation device or a signal relating thereto, i.e. being for example derivable from such overall monitoring signal in an unambiguous manner. By sending the overall monitoring signal or a signal related thereto, the remote recipient may be continuously or repeatedly informed about the monitored status of the set of integrity states of the plurality of elevator features. If necessary, the remote recipient could initiate for example maintenance services in case any safety-relevant insufficiencies of the elevator are derivable from such information.

Alternatively, or additionally, according to an embodiment, the communication device may be configured for sending a request signal to the remote recipient upon determining that the generated overall monitoring signal relates to a status of the set of integrity states, such status requiring prompt inspection of the elevator function by a human inspector.

In other words, instead of continuously or repeatedly transmitting the overall monitoring signal to the remote recipient independently from its current status, the communication device may be configured such that it becomes active only upon detecting that the overall monitoring signal indicates that the monitored set of integrity states of the plurality of elevator features relates to an elevator status which may be safety critical and may therefore require instant or rapid reactions. Such reactions may include at least an inspection of the elevator functions by a human inspector. Accordingly, the communication device may remain inactive as long as no critical overall monitoring signal is observed. Only if such critical overall monitoring signal is generated, the communication device may become active and send a request signal to the remote recipient. Thereby, the remote recipient may be alarmed about the requirement of sending a human inspector to the elevator. Such human inspector could be the remote recipient himself. Alternatively, the remote recipient could assign the guard duties or any maintenance duties to any other person.

According to an embodiment, the evaluation device is further configured for generating a specific overall monitoring signal in case no answer to at least one of the questions is received for a predetermined period of time.

In other words, as at least some of the guard duties should be fulfilled by the questioning device asking consulted persons for their human assistance, problems may occur if there are no persons to be consulted or if consulted persons do not answer. If this is the case for a longer period of time, the evaluation device should realize that the guard device may not fulfil at least some of its guard duties. In reaction thereto, the evaluation device should generate a specific one of overall monitoring signals which may for example indicate a lack of such information to be received based on answers from consulted persons. Such specific overall monitoring signal may then for example be transmitted to a remote recipient using the communication device. Thereby, the remote recipient is informed that at least some of the set of integrity states may currently not be monitored by the guard device. Upon such information, the remote recipient may then decide on suitable measures such as sending a human inspector to the elevator.

According to an embodiment, the questioning device may be configured for generating the second monitoring signal based on a statistics analysis covering a plurality of answers relating to a same current status of the second integrity state.

In other words, the questioning device may generate the second monitoring signal not only by asking a single consulted person for an answer to a respective predetermined question. Instead, the questioning device may ask the same question to a plurality of different consulted persons and may then generate the second monitoring signal based on the answers of all these consulted persons to the same question. Therein, the questioning device may analyze a statistics of the received plurality of answers to the same question.

Thereby, it may be avoided that for example a single wrong answer to a question asked by the questioning device may generate a second monitoring signal which then may be used by the evaluation device for generating the overall monitoring signal upon which for example a decision is made that the elevator requires prompt inspection. Accordingly, by statistically analyzing a plurality of answers to a same question or at least to questions relating to a same current status of the second integrity state, a risk of generating the second monitoring signal based on inadvertently or intendedly wrong answers to the questions may be reduced.

Generally, as the proposed guard device requires the assistance of the consulted persons by answering to asked questions, problems may arise in cases where no consulted persons are willing to cooperate with the guard device and therefore do not answer to the questions or, even worse, in cases where consulted persons intendedly misuse the guard device for example by intendedly providing wrong answers.

Therefore, according to an embodiment, the electronic elevator guard device may be configured for initiating so-called reward actions for the consulted person upon having received the consulted person's answer.

In other words, the guard device may motivate a consulted person to answering to its questions by providing a specific type of reward upon receiving the consulted person's answer.

The reward actions may be manifold. For example, passengers of the elevator may be rewarded for their cooperation by for example establishing prioritized elevator rights. Due to such prioritized elevator rights, a passenger may be transported to his destination under prioritization, i.e. for example without stopping the elevator car at intermediate stops, or an elevator may be sent faster to a specific floor for picking-up a passenger which is waiting at this floor and has answered a question of the questioning device. Other types of reward actions may include for example awards in a bonus program such that a consulted person, after for example having answered to a sufficient number of questions, may e.g. obtain a gift such as a voucher for a visit in a cinema or similar.

However, such rewarding of consulted persons may result in persons answering to the questions of the questioning device quickly and without in fact having checked the integrity state of the elevator feature to which the question relates. Accordingly, the questioning device might receive an excessive number of wrong answers.

Therefore, according to an embodiment, the electronic elevator guard device may be configured for initiating a penalize action for the consulted person upon having received the consulted person's answer and determining that the answer is incorrect.

In other words, it may not only be rewarded if the consulted person answers a question but it could also be penalized in case this answer is incorrect.

Generally, already the knowledge about the option that wrong answers may be penalized may increase the consulted person's honesty. Furthermore, the questioning device may sometimes ask questions to which the answer is already known, simply in order to check the consulted person's honesty. For example, it may be known to the questioning device that specific safety-irrelevant damages or deficiencies are present in the elevator and the questioning device may then ask the consulted person to check for such damages or irregularities.

There may be a variety of penalize actions. For example, already the information given to the consulted person that its answer is wrong may be embarrassing. Furthermore, previously awarded rewards may be withdrawn or the consulted person may be blocked from further answering other questions.

According to an embodiment, the guard device may be configured for identifying an identity of the consulted person.

Such identifying may be necessary for example in case reward actions or penalize actions shall be attributed to a real person. For example, a plurality of known consulted people such as for example tenants of the building served by the elevator, may be predefined and may be for example stored in memory to be accessed by the questioning device. When being asked by the questioning device to answer questions, a consulted person may then first identify himself for example by entering an authorization code assigned to his personal data. After having been identified, the questioning device may accept the consulted person's answer. Various other ways of identifying or authenticating the consulted person are possible, such as providing an identity card, fingerprint recognition, face recognition, voice recognition, etc. Furthermore, it could be also possible for persons without mentioning their identity to answer the questions. For this case, a volunteer can be as the consulted person who are asked just with general questions, or such questions which need a lot of answers of deferent persons.

According to an embodiment, the questioning device may be configured for asking the questions in time intervals being longer than a predetermined minimum time interval.

In other words, the questioning device may be configured such as not to ask questions continuously or in short time intervals. On the one hand, the questioning device should not ask same questions excessively frequently. Asking questions too frequently may annoy users of the elevator. On the other hand, particularly if answering questions is rewarded in any way, asking questions in long time intervals only may avoid that a person attempts answering too many questions only for the sake of the rewards. For example, the intermediate minimum time interval may be at least one minute or preferably at least ten minutes.

According to an embodiment, the human-machine interface is a touchscreen configured for displaying the questions and receiving the answers via manual touch-input.

In other words, in order to enable asking questions and receiving the answers, the human-machine interface may be provided with a touchscreen. Such touchscreen may allow both, displaying the questions for example as written text or visual symbols as well as receiving the answers by the consulted person for example touching onto displayed answering options such as "Yes" or "No". Such touchscreens may be easy to use, may be provided at low costs and may be resistant against vandalism. Other means for visually displaying questions and/or receiving answers may be used alternatively.

Alternatively or additionally, according to an embodiment, the human-machine interface may be a speaker-microphone arrangement configured for outputting the questions as spoken language and receiving the answers via spoken language.

Accordingly, with such speaker-microphone arrangement, the human-machine interface may pronounce a question such that it is heard by the consulted person. The consulted person may then speak the answer into the microphone such that the human-machine interface may receive this answer for example by voice recognition. By implementing such acoustical human-machine interface, a consulted person does not need to touch for example any touchscreen or keyboard. This may be helpful in cases where the person has no hands free or does not want to touch any items for example for hygienic reasons.

Of course, many other types of human-machine interfaces may be used for the questioning device. For example, a combination of visual and acoustical interaction may be established using for example a screen for displaying the questions and a microphone for hearing the answers or a yes-button and a no-button for inputting the answers.

Furthermore, not all components of the human-machine interface necessarily have to be components of the questioning device. For example, human-machine interaction may also be established via portable devices such as smart mobile phones, portable computers, etc. carried by a consulted person. In such case, at least part of the human-machine interface is formed by the portable device which may then interact with interface components of the questioning device such as to transfer any information for exchange between the consulted person and the questioning device.

According to an embodiment of the elevator proposed herein, the human-machine interface of the questioning device may be arranged at a waiting area in a floor of a building next to a floor door of the elevator. Alternatively, the HMI may be arranged at an interior space within an elevator car.

It has been found to be beneficial to arrange the HMI in a waiting area where passengers wait for an elevator car to come. In such situation, passengers typically have sufficient time for interacting with the questioning device and may answer for example questions about mechanical damages at the floor door, about whether an elevator shaft is freely and securely accessible, etc. For example, the HMI may be incorporated or integrated into or cooperate with a landing operation panel (LOP) of the elevator.

Alternatively or additionally, an HMI may be provided within the elevator car. While passengers typically have only limited time within the elevator car, some of the integrity states to be monitored by the guard device may only be inspected from within the elevator car. For example, a passenger in the elevator car may be asked by the questioning device whether interior walls of the elevator car are mechanically damaged. For example, such HMI may be incorporated or integrated into or cooperate with a car operation panel (COP) of the elevator.

It shall be noted that possible features and advantages of embodiments of the invention are described herein partly with respect to an electronic elevator guard device, partly with respect to an electronic elevator guard method to be performed preferably by such device and partly with respect to an elevator comprising such electronic elevator guard device. One skilled in the art will recognize that the features may be suitably transferred from one embodiment to another and features may be modified, adapted, combined and/or replaced, etc. in order to come to further embodiments of the invention.

In the following, advantageous embodiments of the invention will be described with reference to the enclosed drawings. However, neither the drawings nor the description shall be interpreted as limiting the invention.

The figures are only schematic and not to scale. Same reference signs refer to same or similar features.

DETAILED DESCRIPTION

At least in some countries, an operator of an elevator is obliged to fulfil a plurality of tasks or duties in order to guarantee a safe operation of the elevator. Such tasks or duties may be defined in official regulations such as the German TRBS 3121. Conventionally, the tasks or duties are fulfilled by a mandated person generally referred to as an "elevator guard". Such elevator guard has to monitor several integrity states of a plurality of elevator features on a regular basis. Such monitoring is generally required in addition to maintenance services to be provided by the producer of the elevator or its maintenance staff.

As proposed herein, the duties or tasks conventionally provided by the human elevator guard shall be provided at least in part or with the help, respectively, of a technical device, i.e. an electronic elevator guard device according to an embodiment of the present invention.

Figure 1:
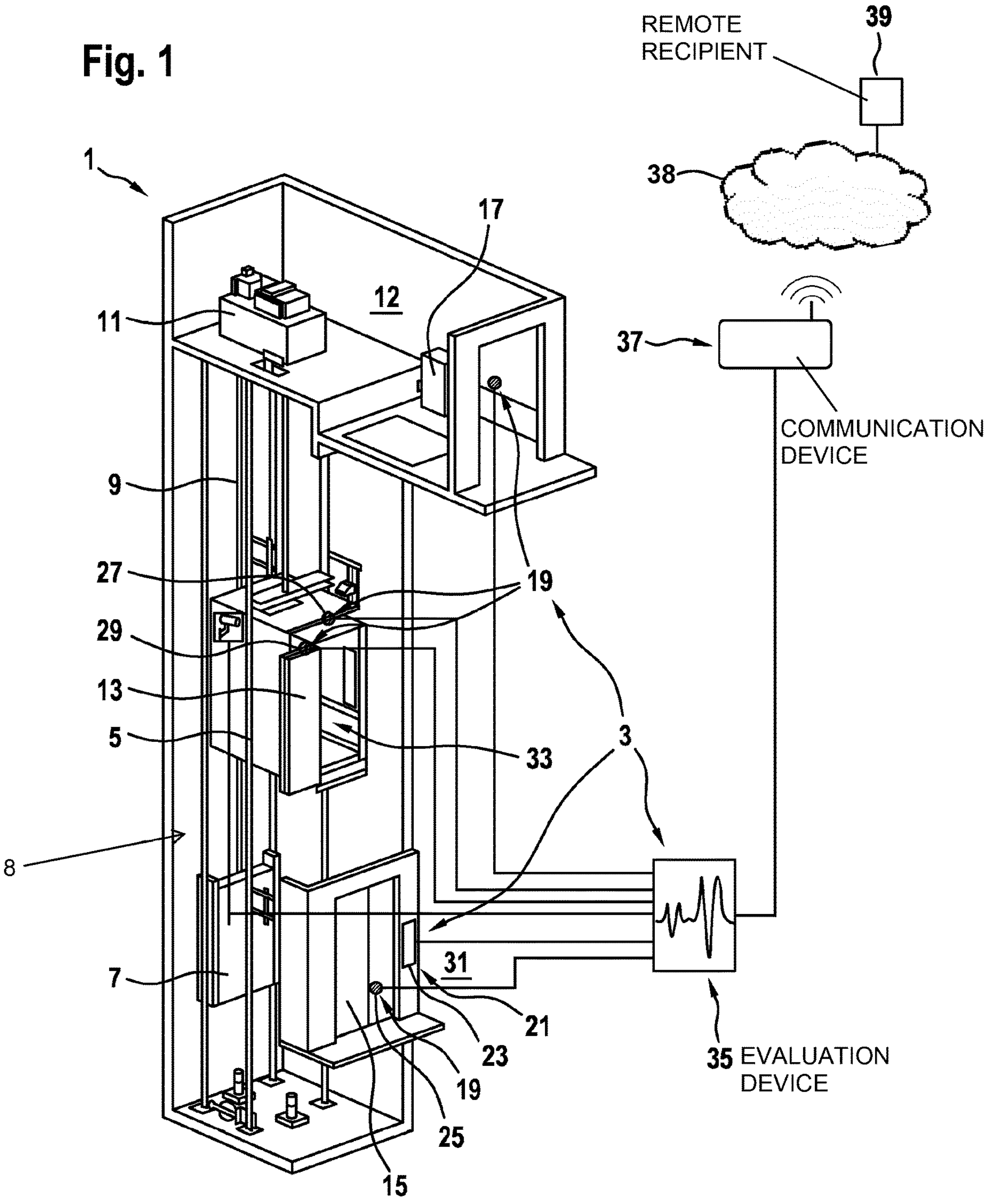
FIG. 1 shows an elevator according to an embodiment of the present invention.

FIG. 1 shows an elevator 1 with an electronic elevator guard device 3 according to an embodiment of the present invention.

The elevator 1 comprises an elevator car 5 and a counterweight 7 suspended by several suspension traction members 9 such as ropes or belts. The suspension traction members 9 may be driven by a drive engine 11 positioned in an engine room 12, thereby displacing the car 5 and the counterweight 7 within an elevator shaft 8. An operation of the drive engine 11 and of other components such as an elevator car door 13 or elevator floor doors 15 may be monitored and/or controlled by an elevator control 17.

The electronic elevator guard device 3 comprises or communicates with a plurality of sensors 19. Each of the sensors 19 may monitor at least one integrity state of an elevator feature. Furthermore, the electronic elevator guard device 3 comprises a questioning device 21. The questioning device 21 comprises or communicates with a human machine interface (HMI) 23.

Some of the elevator guard's tasks or duties may be easily and/or economically be monitored using a single sensor 19 or a system of multiple sensors 19.

For example, checking whether or not the elevator car 5 is correctly prevented from moving as long as at least one of the floor doors 15 is not completely closed may be easily technically implemented using for example self-testing door switches 25 as sensors 19 at each of the floor doors 15. Similarly, whether or not a floor door 15 may be opened as long as the elevator car 5 is outside of an unlocking area of this door 15 may be tested by technical sensors 19 such as self-testing location sensors 27 arranged in the elevator shaft 8 and sensing a presence of the elevator car in a specific area of the shaft 8. Whether or not an emergency call device is correctly operable may also be automatically monitored using self-test sensors. Furthermore, whether or not a lighting of the elevator car 5 is operable may be easily monitored using for example a light sensor. As another example, whether or not the elevator car 5 may move as long as the elevator car door 13 is not fully closed may also be tested by sensors 19 such as an elevator car door switch 29. Finally, whether or not the elevator may provide for a required stopping accuracy at each of the various floors in a building may be tested using position-sensing sensors.

While there is a multiplicity of possible sensors 19 for monitoring specific elevator features with regard to their current integrity states, only some of these sensors 19 are indicated in FIG. 1.

While the electronic elevator guard device 3 comprises one or multiple sensors 19, each of the sensors 19 being configured for monitoring at least one of the integrity states of one elevator feature by technical means and preferably in an automated manner and generates at least one first monitoring signal based on such sensed current status of first integrity states, the electronic elevator guard device 3 further comprises the questioning device 21 for interacting with consulted persons via the human machine interface 23.

Such persons may be regular passengers of the elevator 1. Preferably, the consulted persons are specific persons such as for example specific tenants of a building served by the elevator 1, such specific persons for example having previously been selected and authorized for cooperating with the electronic elevator guard device 3.

The questioning device 21 generally comprises a memory with a set of questions stored therein. Such questions relate to at least one of second integrity states of an elevator feature. Particularly, the questions may relate to elevator features which may hardly or not economically be monitored on a purely technical basis but which may be easily monitored using human senses. Accordingly, the questioning device may ask the consulted person via its associated human machine interface by issuing at least one of a set of predetermined questions and waiting for the consulted person's answer. Based on such one or more answers to one or more questions, the questioning device 21 may generate a second monitoring signal.

For example, the questioning device may ask the consulted person whether one of the floor doors 15 is mechanically damaged. While mechanical damages to a door 15 may be difficult to recognize by simple sensors and may, at most, be detected technically using complicated expensive devices such as e.g. a camera including dedicated image processing capabilities, such mechanical damages may be relatively easy to be recognized by a person with his human senses, especially with his eyes and/or his tactile sense. The question to the consulted person may be asked for example via a human machine interface 23 being arranged in a waiting area 31 in a floor next to the floor door 15.

Similarly, a passenger being located in an interior space 33 of the elevator car 5 may be asked whether the car door 13 is mechanically damaged and/or whether walls of the elevator car 5 are mechanically damaged. Furthermore, in a specific case in which the elevator car 5 has no car door 13, a car passenger may be asked whether a wall of the elevator shaft 8 at an entrance side of the elevator car 5 is damaged.

As another option, the consulted person may be asked whether an access to the elevator shaft 8 is open, i.e. not blocked, and may be accessed securely. Furthermore, a passenger may be asked whether written indications concerning e.g. passenger evacuation at a main entrance are readable and up to date. Further questions may relate to whether an access to the engine 11 or the engine room 12 or an associated control device 17 is open, i.e. not blocked, and securely accessible and/or whether no items not related to elevator operation are stored within the machine room 12 of the elevator 1. Finally, a consulted person may be asked whether the elevator 1 may be correctly used and operated in accordance with specifications for example of the elevator manufacturer.

Accordingly, preferably those duties and tasks of an elevator guard which may hardly or not economically be implemented using sensors 19 or other technical means may be fulfilled by proactively involving consulted persons by asking them related questions and waiting for their answers. Upon receiving answers to the questions, the questioning device 21 may generate one or more second monitoring signals based on the answers.

Finally, an evaluation device 35 may generate an overall monitoring signal based on the first and second monitoring signals. Such evaluation device 35 may process or analyze signals from all sensors 19 based on the first monitoring signals as well process or analyze answers to questions of the questioning device 21 as represented by the second monitoring signals.

The evaluation device 35 may then forward the overall monitoring signal or a signal related thereto to a communication device. This communication device 37 may send corresponding signals to a remote recipient 39. The communication may be transmitted via hardwiring or wirelessly, preferably over a network connection 38, using internet or cloud services.

The remote recipient 39 typically is a machine which receives the signal emitted by the communication device 37. The remote recipient 39 may be configured for initiating suitable actions such as temporarily interrupting an operation of the elevator 1 until the elevator 1 has been suitably checked for example by maintenance staff. Alternatively and preferably, the remote recipient may 39 be a receiver which directly informs a responsible person such that the person or mandated person may go and visit the elevator 1 and perform e.g. an on-site check of the elevator 1.

Figure 2:
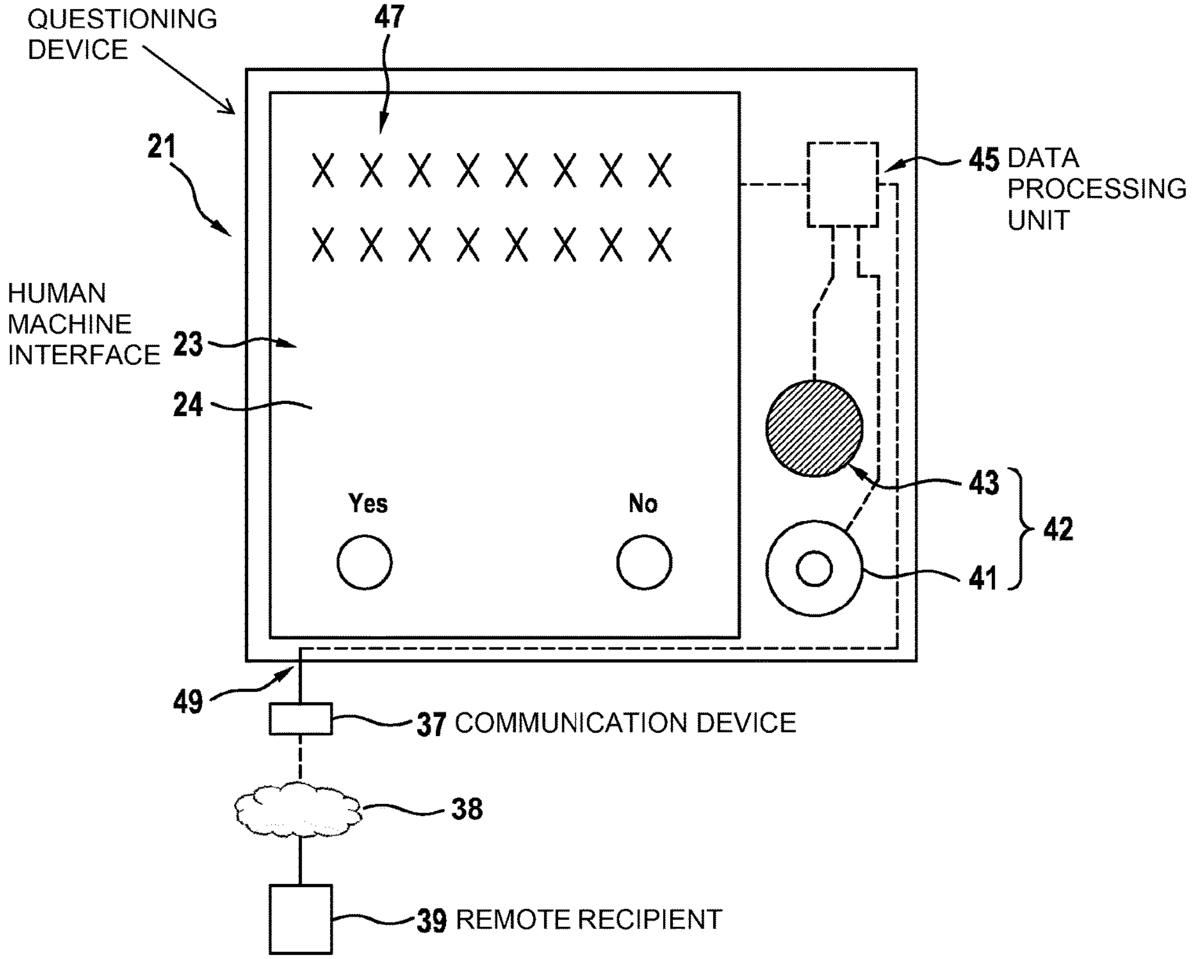
FIG. 2 shows a questioning device of an electronic elevator guard device according to an embodiment of the present invention.

FIG. 2 shows an example of a questioning device 21 for an embodiment of the electronic elevator guard device 3.

The questioning device 21 comprises a touchscreen 24 forming the human machine interface 23. On the touchscreen 24, a question 47 may be displayed to a consulted person. Preferably, the question 47 should be formulated such that it can be answered simply by "Yes" or "No". Accordingly, the touchscreen 24 may have corresponding Yes/No areas which may be pushed by the consulted person for entering an answer to the question 47.

Alternatively or additionally, the questioning device 21 may comprise a speaker-microphone arrangement 42 comprising a speaker 41 and a microphone 43. The speaker 41 may be either used for emitting an acoustical signal for example for attracting the consulted person's attention. Alternatively, one of the questions may be output as spoken language via the speaker 41. The addressed person may then give his answer either by pushing one of the Yes/No areas on the touchscreen 24 or by answering in spoken language to be detected by the microphone 43.

The touchscreen 24 and/or the speaker-microphone arrangement 42 are connected to a data processing unit 45. This data processing unit 45, on the one hand, may comprise memory in which the questions 47 are stored. On the other hand, the data processing unit 45 may process the answers forwarded by the touchscreen 24 and/or by the microphone 43 in order to generate the second monitoring signal therefrom. This second monitoring signal or a signal related thereto may then be issued for example via an interface 49 connected to the communication device 37 such that a corresponding signal may finally be sent to the remote recipient 39.

The questioning device 21 may be a unitary device which may be installed for example in a waiting area 31 next to a floor door 15 or in an interior space 33 of the elevator car 5.

Alternatively, the questioning device 21 may comprise two or more separate devices wherein one device is for example integrated into the elevator 1 and another device may be separate therefrom and may be for example a handheld device such as a smart mobile phone or a portable computer of a consulted person. In such case, the questioning device 21 may for example send an SMS or a push-message to the portable device and the consulted person may enter his answer into his portable device using for example a touchscreen of this portable device as the human machine interface 23. For example, a specific App may be installed on such portable device for suitable communication with the elevator-based part of the questioning device 21.

Using the electronic elevator guard device 3, integrity states of a plurality of elevator features may be monitored partly automatically using sensors 19 and partly using the assistance of consulted persons answering to questions issued by the questioning device 21. Overall, using such guard device 3, repeated monitoring of the elevator 1 by specific human elevator guard may be dispensable such that significant efforts and costs may be saved.

Finally, it should be noted that the term "comprising" does not exclude other elements or steps and the "a" or "an" does not exclude a plurality. Also, elements described in association with different embodiments may be combined.

In accordance with the provisions of the patent statutes, the present invention has been described in what is considered to represent its preferred embodiment. However, it should be noted that the invention can be practiced otherwise than as specifically illustrated and described without departing from its spirit or scope.

LIST OF REFERENCE SIGNS

1 elevator
3 electronic elevator guard device
5 elevator car
7 counterweight
8 elevator shaft
9 suspension traction members
11 drive engine
12 engine room
13 car door
15 floor door
17 elevator control
19 sensors
21 questioning device
23 human machine interface
24 touchscreen
25 door switch
27 location sensors
29 car door switch
31 waiting area at floor
33 interior space in elevator car
35 evaluation device
37 communication device
38 network connection
39 remote recipient
41 speaker
42 speaker-microphone arrangement
43 microphone
45 data processing unit
47 question
49 interface

The invention claimed is:

1. An electronic elevator guard device for monitoring a set of integrity states of a plurality of elevator features of an elevator, the electronic elevator guard device comprising:

a sensor installed in the elevator and adapted to monitor a first integrity state of the set of integrity states, the sensor generating a first monitoring signal based on a sensed current status of the first integrity state;

a questioning device including or communicating with a human-machine interface and adapted to ask predetermined questions to a consulted person and to receive answers of the person via the human-machine interface, the questions relating to a current status of a second integrity state of the set of integrity states, the second integrity state not monitored by any sensor, the questioning device generating a second monitoring signal based on at least one of the answers, wherein the questioning device asks the questions at time intervals being longer than a predetermined minimum time interval; and an evaluation device connected to the sensor and to the questioning device, the evaluation device generating an overall monitoring signal based on the first monitoring signal and the second monitoring signal, the overall monitoring signal indicating a current safety status of the elevator.

2. The electronic elevator guard device according to claim 1 including a communication device connected to the evaluation device and adapted for sending signals to a remote recipient.

3. The electronic elevator guard device according to claim 2 wherein the communication device sends one of the signals related to the overall monitoring signal to the remote recipient.

4. The electronic elevator guard device according to claim 2 wherein the communication device sends a request signal to the remote recipient upon determining that the overall monitoring signal relates to a status of the set of integrity states requiring prompt inspection of an elevator function by a human inspector.

5. The electronic elevator guard device according to claim 1 wherein the evaluation device generates a specific overall monitoring signal in response to no answer to at least one of the questions being received for a predetermined period of time.

6. The electronic elevator guard device according to claim 1 wherein the questioning device generates the second monitoring signal based on a statistics analysis covering a plurality of the answers relating to the current status of the second integrity state.

7. The electronic elevator guard device according to claim 1 being adapted to initiate a reward action for the consulted person upon receiving one of the answers from the consulted person.

8. The electronic elevator guard device according to claim 1 being adapted to initiate a penalize action for the consulted person upon receiving one of the answers from the consulted person and determining that the one answer is incorrect.

9. The electronic elevator guard device according to claim 1 being adapted to identify an identity of the consulted person.

10. The electronic elevator guard device according to claim 1 wherein the human machine interface is a touchscreen for displaying the questions and receiving the answers via a manual touch-input.

11. The electronic elevator guard device according to claim 1 wherein the human machine interface is a speaker-microphone arrangement for outputting the questions as spoken language and receiving the answers via spoken language.

12. An elevator comprising the electronic elevator guard device according to claim 1 for monitoring the set of integrity states of the plurality of elevator features of the elevator.

13. The elevator according to claim 12 wherein the human machine interface is arranged at at least one of a waiting area in a floor next to a floor door of the elevator and an interior space within an elevator car of the elevator.

14. A method for monitoring a set of integrity states of a plurality of elevator features of an elevator, the method comprising the steps of:

monitoring a first integrity state of one of the elevator features using a sensor installed in the elevator and generating a first monitoring signal based on a sensed current status of the first integrity state;

asking predetermined questions to a consulted person and receiving answers to the questions from the person using a questioning device communicating with a human-machine interface, the questions relating to a current status a second integrity state of another one of the elevator features, the second integrity state not monitored by any sensor, and generating a second monitoring signal based on at least one of the answers; and generating an overall monitoring signal based on the first monitoring signal and the second monitoring signal, the overall monitoring signal indicating a current safety status of the elevator.

15. An electronic elevator guard device for monitoring a set of integrity states of a plurality of elevator features of an elevator, the integrity states being related to a safety status of the elevator, the electronic elevator guard device comprising:

at least one sensor installed in the elevator and adapted to monitor at least a first integrity state of the set of integrity states, the sensor generating a first monitoring signal based on a sensed current status of the first integrity state;

a questioning device including or communicating with a human-machine interface and adapted to ask predetermined questions to a consulted person and for receiving answers of the person via the human-machine interface, the questions relating to a current status of a second integrity state of the set of integrity states, the second integrity state not monitored by any sensor, the questioning device generating a second monitoring signal based on at least one of the answers, wherein the questioning device asks the questions at time intervals being longer than a predetermined minimum time interval; and an evaluation device connected to the at least one sensor and the questioning device, the evaluation device generating an overall monitoring signal based on the first monitoring signal and the second monitoring signal, the overall monitoring signal indicating a current safety status of the elevator.

* * * * *